United States Patent
Kapadia et al.

(10) Patent No.: US 11,477,092 B2
(45) Date of Patent: Oct. 18, 2022

(54) CONFIGURING SECURE CONNECTIVITY BETWEEN DEVICES IN SEPARATE SITES OF A MULTI-SITE DOMAIN

(71) Applicant: Cisco Technology, Inc., San Jose, CA (US)

(72) Inventors: Shyam Kapadia, San Jose, CA (US); Liqin Dong, San Jose, CA (US); Lukas Krattiger, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 84 days.

(21) Appl. No.: 16/930,947

(22) Filed: Jul. 16, 2020

(65) Prior Publication Data

US 2021/0377128 A1 Dec. 2, 2021

Related U.S. Application Data

(60) Provisional application No. 63/033,589, filed on Jun. 2, 2020.

(51) Int. Cl.
*H04L 41/14* (2022.01)
*H04L 45/02* (2022.01)
(Continued)

(52) U.S. Cl.
CPC ......... *H04L 41/145* (2013.01); *H04L 9/0838* (2013.01); *H04L 9/0894* (2013.01);
(Continued)

(58) Field of Classification Search
CPC ......... H04L 45/64; H04L 45/38; H04L 45/42; H04L 45/02; H04L 43/026; H04L 45/74;
(Continued)

(56) References Cited

U.S. PATENT DOCUMENTS

| 10,728,121 B1* | 7/2020 | Chitalia | H04L 41/12 |
| 2016/0028603 A1* | 1/2016 | Chakrabarti | H04L 43/50 |
| | | | 370/252 |

(Continued)

FOREIGN PATENT DOCUMENTS

EP 3611880 A1 2/2020

OTHER PUBLICATIONS

PCT Search Report and Written Opinion dated Sep. 2, 2021 for PCT App. No. PCT/US21/33896, 72 pages.

*Primary Examiner* — Djenane M Bayard
(74) *Attorney, Agent, or Firm* — Lee & Hayes, P.C.

(57) ABSTRACT

Techniques for utilizing a Software-Defined-Networking (SDN) controller and/or a Data Center Network Manager (DCNM) and network border gateway switches associated with a multi-site cloud computing network to provide reachability data indicating physical links between the border gateways disposed in different sites of the multi-site network to establish secure connection tunnels utilizing the physical links and unique encryption keys. The SDN controller and/or DCNM may be configured to generate a physical underlay model representing the physical underlay, or network transport capabilities, and/or a logical overlay model representing a logical overlay, or overlay control-plane, of the multi-site network. The SDN controller may also generate an encryption key model representing the associations between the encryption keys and the physical links between the associated network border gateway switches. The SDN controller may utilize the models to determine route paths for transmitting network traffic spanning over different sites of the multi-site network at line speed.

20 Claims, 7 Drawing Sheets

(51) Int. Cl.
  *H04L 9/32* (2006.01)
  *H04L 9/08* (2006.01)
  *H04L 45/64* (2022.01)

(52) U.S. Cl.
  CPC ............ *H04L 9/3215* (2013.01); *H04L 45/02* (2013.01); *H04L 45/64* (2013.01)

(58) Field of Classification Search
  CPC . H04L 69/22; H04L 12/4633; H04L 43/0852; H04L 43/10; H04L 45/54; H04L 45/745; H04L 43/12; H04L 43/062; H04L 41/12; H04L 41/0806; H04L 45/306; H04L 47/2483; H04L 12/4641; H04L 43/16; H04L 67/327; H04L 41/0893; H04L 67/34; H04L 41/0813; H04L 41/0896; H04L 43/0829; H04L 43/0858; H04L 45/24; H04L 49/3063; H04L 63/0218; H04L 41/40; H04L 41/0853; H04L 41/0873; H04L 41/22; H04L 41/0895; H04L 41/145; H04L 45/48; H04L 49/70; H04L 12/4645; H04L 41/06; H04L 41/0686; H04L 41/122; H04L 43/0817; H04L 43/20; H04L 45/50; H04L 45/52; H04L 45/586; H04L 45/748; H04L 49/25; H04L 69/18; H04L 41/342; H04L 47/70; H04L 49/1515; H04L 9/0838; H04L 9/0894; H04L 9/3215; H04L 63/04; H04L 63/06

See application file for complete search history.

(56) References Cited

U.S. PATENT DOCUMENTS

| | | | |
|---|---|---|---|
| 2016/0218917 A1* | 7/2016 | Zhang | H04L 49/35 |
| 2017/0026417 A1* | 1/2017 | Ermagan | H04L 63/0272 |
| 2018/0013556 A1* | 1/2018 | Saavedra | H04L 67/12 |
| 2021/0019131 A1* | 1/2021 | Tulsian | H04L 41/0853 |
| 2021/0320820 A1* | 10/2021 | Ruan | H04L 49/25 |

* cited by examiner

500

502 SEND, TO A SOFTWARE-DEFINED-NETWORKING (SDN) CONTROLLER AND FROM A FIRST DEVICE IN A FIRST SITE OF A MULTI-SITE NETWORK, REACHABILITY DATA INDICATING A PHYSICAL LINK BETWEEN THE FIRST DEVICE AND A SECOND DEVICE IN A SECOND SITE OF THE MULTI-SITE NETWORK

504 SEND, TO THE SDN CONTROLLER AND FROM THE FIRST DEVICE, METADATA INDICATING AN INTERNET PROTOCOL (IP) ADDRESS AND A NETWORKING PROTOCOL ASSOCIATED WITH THE FIRST DEVICE

506 RECEIVE, AT THE FIRST DEVICE AND FROM THE SDN CONTROLLER, ROUTING DATA INDICATING A DATA TRANSMISSION ROUTE BETWEEN THE FIRST DEVICE AND THE SECOND DEVICE

508 RECEIVE, AT THE FIRST DEVICE AND FROM THE SDN CONTROLLER, AN ENCRYPTION KEY CONFIGURED TO ESTABLISH A SECURE CONNECTION TUNNEL BETWEEN THE FIRST DEVICE AND THE SECOND DEVICE

510 UTILIZE, BY THE FIRST DEVICE, THE ENCRYPTION KEY TO ESTABLISH THE SECURE CONNECTION TUNNEL BETWEEN THE FIRST DEVICE IN THE FIRST SITE AND THE SECOND DEVICE IN THE SECOND SITE

FIG. 5

CONFIGURING SECURE CONNECTIVITY BETWEEN DEVICES IN SEPARATE SITES OF A MULTI-SITE DOMAIN

RELATED APPLICATIONS

This application claims priority to U.S. Provisional Patent Application No. 63/033,589, filed on Jun. 2, 2020, the entire contents of which are incorporated herein by reference.

TECHNICAL FIELD

The present disclosure relates generally to utilizing reachability data indicating physical links between devices in separate sites of a multi-site domain network to generate physical underlay and logical overlay models of the network and establish a secure interconnection between devices in the separate sites of the multi-site domain.

BACKGROUND

Cloud computing provides users with access to computing resources to fulfill users' computing resource needs. In some examples, service providers can manage and provide cloud computing resources to users to fulfill their needs without the users having to invest in and maintain their own computing infrastructure. Cloud computing often involves the use of networks of data centers which house servers, routers, and other devices that provide computing resources to users such as compute resources, networking resources, storage resources, database resources, application resources, and so forth. As datacenters keep getting bigger on-premises and expand to multi-site cloud environments, the need for secure interconnection of these sites to allow for encryption of traffic at line rate, while ensuring confidentiality, data integrity, and scalability continues to grow. For example, each time a new site is added, numerous repetitive configurations must be provisioned in the new site as well as remote sites to accommodate such an addition.

To support the integration of a new site into a multi-site domain, necessary configurations depend on locations of respective devices within the local site's topology as well as the interconnectivity topology. With modern multi-site domains capable of supporting a large number of sites and specialized networking devices, such as border gateways utilized for interconnect of the sites, the amount of coordinate configuration that must be provisioned on the associated network devices becomes increasingly extensive. Additionally, the pair-wise securing of the interconnectivity relationship grows exponentially.

To effectively support the expansion of multi-site domains utilizing a network controller, an understanding of the different physical and logical connectivity relationships must be realized. Extending this understanding across multiple sites and adding multi-tenancy support aspects requires a holistic view from the topology point of view. While configurations can be generated by automation tools, mapping out and understanding the required connectivity relationships remains as a huge burden on a network administrator. Even utilizing configuration automation still leaves the overall system at risk for impairment if one of these relationships is forgotten. In addition to physical links that require internet protocol (IP) address and routing adjacencies in an arbitrary topology representing a network underlay, the logical overlay of the network requires a multi-tenant aware reachability exchange of information. While the network underlay and overlay may be well known entities, the amount of connectivity relationships required to configure such a network grows with every border gateway, core router, or site that is added. Additionally, to allow for scalability of the multi-site network, a pre-shared encryption key may be utilized to secure interconnectivity between border gateways in different sites. However, the use of pre-shared keys may cause the network to suffer from various security limitations.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 illustrates a flow diagram of an example method for network border gateways that are physically linked and disposed in different sites of a multi-site cloud computing network to send indications of the physical link to a Software-Defined-Networking (SDN) controller of the multi-site network and utilize the physical link to establish a secure connection tunnel with a unique encryption key.

DESCRIPTION OF EXAMPLE EMBODIMENTS

Overview

Figure 1A:
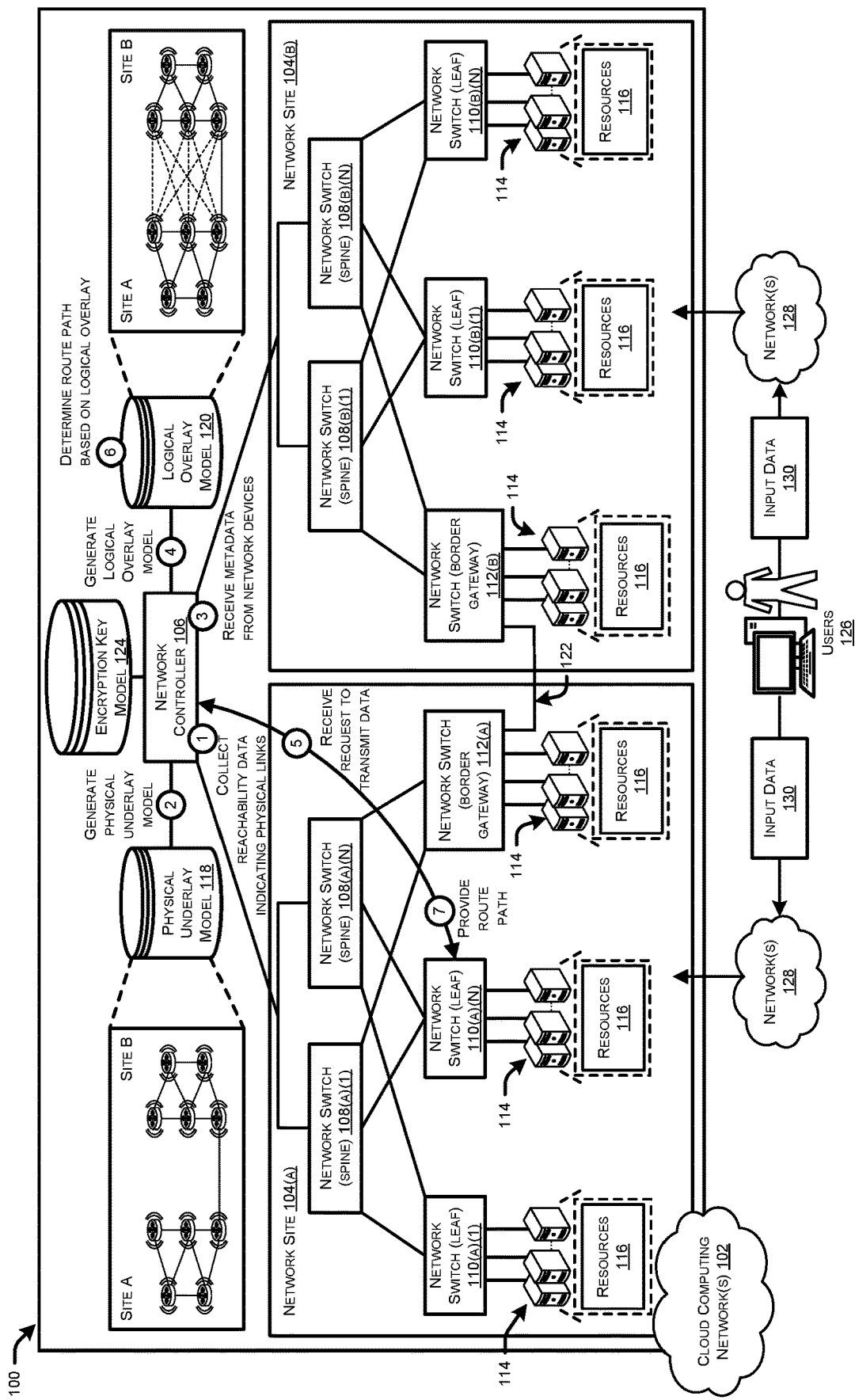
FIG. 1A illustrates a system-architecture diagram of an example flow for a network controller of a multi-site cloud computing network to collect reachability data and generate physical underlay and logical overlay models of the multi-site network to determine route paths across different sites of the multi-site network.

This disclosure describes a method of utilizing Software-Defined-Network (SDN) controllers and network border gateways of multi-site networks to provide reachability data indicating physical links between border gateways in different sites of the multi-site network to establish secure connection tunnels utilizing the physical links and unique encryption keys. The method includes collecting, by a Software-Defined-Networking (SDN) controller, reachability data indicating physical links between one or more first devices in a first site and one or more second devices in a second site. The method may further include generating, by the SDN controller and based at least in part on the reachability data, a first model representing a physical underlay of a multi-site network including the first site and the second site. The method may further include, by the SDN controller, to allocate the IP subnet to the physical link based on a globally managed pool by the SDN controller, and generate routing configuration between the neighboring pair. Alternatively, the method may further include receiving, at the SDN controller, metadata indicating internet protocol (IP) addresses and networking protocols associated with the one or more first devices and the one or more second devices. The method may further include generating, by the SDN controller and based at least in part on the first model and the metadata, a second model representing a logical overlay of the multi-site network, the logical overlay indicating reachability between the one or more first devices and the one or more second devices and EVPN peering between them.

Additionally, or alternatively, the method includes sending, to a Software-Defined-Networking (SDN) controller and from a first device in a first site of a multi-site network, reachability data indicating a physical link between the first device and a second device in a second site of the multi-site network. The method may further include sending, to the SDN controller and from the first device, metadata indicating an internet protocol (IP) address and a networking protocol associated with the first device. The method may further include receiving, at the first device and from the SDN controller, IP address assignment and routing configuration indicating a routing peering between the first device and the second device. The method may further include receiving, at the first device and from the SDN controller, an encryption key configured to establish a secure connection tunnel between the first device and the second device. The method may further include utilizing, by the first device, the encryption key to establish the secure connection tunnel between the first device in the first site and the second device in the second site.

Additionally, the techniques described herein may be performed by a system and/or device having non-transitory computer-readable media storing computer-executable instructions that, when executed by one or more processors, performs the method described above.

EXAMPLE EMBODIMENTS

As discussed above, the growth of multi-site cloud environments requires numerous repetitive configuration provisioning in new sites as well as remote sites to establish secure interconnection of these sites and allow for encryption traffic at line rate without sacrificing scalability. While a network administrator may utilize configuration automation tools to assist with the burden of mapping out and understanding required connectivity relationships, the risk of forgetting a connectivity relationship of these multi-site networks and encrypting interconnectivity links with pre-shared encryption keys may lead to various inefficiencies and put the overall system at risk.

This disclosure describes techniques for multi-site network controllers, such as, for example, data center network managers (DCNM) and/or Software-Defined-Networking (SDN) controllers, to collect reachability data indicating physical links between border gateways in different sites of the multi-site network to generate physical underlay and logical overlay models of the multi-site network and establish secure interconnection between the border gateways in the different sites. The border gateway devices may utilize unique encryption keys to establish secure connection tunnels to support the interconnection of the multi-site network and allow for encryption of traffic at line rate. Further, the network controller may maintain a mapping of the unique encryption keys to there respective connection tunnels. According to the techniques and mechanisms described herein, each multi-site network may have a network controller, and each site of the multi-site network may have one or more border gateway devices that are communicatively coupled to one or more border gateway devices of an additional, separate site.

The individual sites of a multi-site network may include one or more network switches. In some examples, the network switches may be configured as a network spine switch, a network leaf switch, and/or a network border gateway switch. In some examples, the one or more network switches included in a network site may be physically connected to one another. Additionally, or alternatively, a network border gateway switch disposed in a first site of the multi-site network may be physically connected to another network border gateway switch disposed in a second site of the multi-site network. Additionally, or alternatively, a network border gateway switch disposed in a first site of the multi-site network may be physically connected to a core router which is not part of any sites. In some examples, the network border gateway switch(es) may generate reachability data indicating such a physical link using various network protocols, such as, for example, a Link Layer Discovery Protocol (LLDP), a Control Point Discovery (CPD) protocol, or a Cisco Discovery Protocol (CDP). In some examples, the network border gateway switch(es) may be configured to send the reachability data to the network controller associated with the multi-site network.

The network controller associated with the multi-site network may be configured to collect the reachability data and/or the metadata from one or more devices of the individual sites of the multi-site network. In some examples, the network controller may be configured to collect the reachability data and/or the metadata from devices configured as network border gateway switches. In some examples, the network controller may be configured to utilize the reachability data indicating the physical links between the network border gateway switch(es) of the individual sites of the multi-site network and its neighboring switch to generate a model representing a physical underlay of the multi-site network and generate IP subnet and routing configuration for the underlay. Additionally, or alternatively, the network controller may be configured to utilize the model representing the physical underlay, or network transport capabilities, of the multi-site network to generate a model representing a logical overlay, or overlay control-plane, of the multi-site network.

Additionally, or alternatively, the network controller may be configured to generate encryption keys configured to establish secure connection tunnels between the border gateway switch(es) of the individual sites of the multi-site network. In some examples, the network controller may be configured to generate universal encryption keys configured to establish all of the secure encryption tunnels between the border gateway switch(es) of the individual sites of the multi-site network. Additionally, or alternatively, the network controller may be configured to utilize the metadata indicating the IP addresses and network protocols of the network border gateway switch(es) of the individual sites of the multi-site network to generate pair-wise encryption keys. In some examples, the pair-wise encryption keys may be configured to be unique from one another and to establish a secure encryption tunnel between a pair of network border gateway switches that are associated with the input metadata. In some examples, the network controller may be configured to generate an encryption key model including the pair-wise encryption keys. For example, the network controller may be configured to store a mapping, or an association between an encryption key and the logical link between the associated network border gateway switches in an encryption key data store associated with the network controller. In some examples, the network controller may be configured to utilize the encryption key data store to generate the encryption key model representing the associations between the encryption keys and the links between the associated network border gateway switches. Additionally, or alternatively, the network controller may be configured to generate and/or provide a cryptographic algorithm associated with the encryption key to the associated network border gateway switches.

In an example cloud computing network, a network controller, a first network site, and a second network site may be disposed in a multi-site network. Additionally, or alternatively, a first border gateway switch and one or more first network switches including a first network leaf switch may be disposed in the first site of the multi-site network. Additionally, or alternatively, a second border gateway switch and one or more second network switches including a second network leaf switch may be disposed in the second site of the multi-site network. Additionally, or alternatively, the first border gateway switch of the first site may be physically linked to the second border gateway switch of the second site.

In some examples, the first network border gateway switch may send reachability data indicating the physical link between the first border gateway switch and its neighboring switch which could be a core router, or the second border gateway switch to the network controller. Additionally, or alternatively, the second border gateway switch may send reachability data indicating the physical link between the second border gateway switch and its neighboring switch, which could be the same or different core router, or the first border gateway switch to the network controller. Additionally, or alternatively, the network controller may be configured to collect the reachability data from the first border gateway switch and/or the second border gateway switch. In some examples, the network controller may utilize the reachability data to generate a physical underlay model of the multi-site network.

In some examples, the network controller may allocate IP subnet from its pool to the underlay external physical links and configure networking protocol between the first border gateway switch and its neighboring switch connected by the external physical link. Additionally, or alternatively, the network controller may allocate IP subnet from its pool to the underlay external physical links and configure networking protocol between the second border gateway switch and its neighboring switch connected by the external physical link. In some examples, the network controller may utilize the physical underlay model and/or the metadata to generate a logical overlay model of the multi-site network, including the EVPN BGP peering configuration between border gateway switches in different sites, or between border gateway switches and the router server. The EVPN peering enables the exchange of overlay network/vrf information between the various sites.

In some examples, the network controller may utilize the metadata associated with the first border gateway switch and/or metadata associated with the second border gateway switch generate a pair-wise encryption key associated with the logical link between the first border gateway switch and the second border gateway switch. In some examples, the network controller may store an association between the encryption key and the logical link between the first border gateway switch and the second border gateway switch in an encryption key datastore associated with the network controller. Additionally, or alternatively, the network controller may utilize the encryption key data store to generate an encryption key model representing the association between the encryption key and the logical link between the first border gateway switch and the second border gateway switch.

In some examples, the network controller may send the pair-wise encryption key to the first border gateway switch and/or the second border gateway switch. Additionally, or alternatively, the network controller may send a cryptographic algorithm associated with the encryption key to the first border gateway switch and/or the second border gateway switch. In some examples, the first border gateways switch and/or the second border gateway switch may utilize the encryption key and/or the cryptographic algorithm to establish a secure connection tunnel utilizing the logical link between the first border gateway switch and the second border gateway switch.

In some examples, the first network leaf switch in the first site may send a request to transmit data associated with a first computing resource in association with the first network leaf switch to a second computing resource in association with the second network leaf switch in the second site to the network controller. Additionally, or alternatively, the one or more first network switches of the first site may include a first network spine switch. In some examples, the first network leaf switch may send the request to the first network spine switch and the first network spine switch may forward the request to the network controller. In some examples, the network controller may utilize the physical underlay model, the logical overlay model, and/or the encryption key model to determine a route path from the first network leaf switch in the first site to the second network leaf switch in the second site. In some examples, the route path may include the secure connection tunnel utilizing the physical link between the first border gateway switch and the second border gateway switch. In some examples, the network controller may provide the route path to the first network leaf switch. Additionally, or alternatively, the network controller may provide an indication of the route path to the first network spine switch and the first network spine switch may forward the indication of the route path to the first network leaf switch. In some examples, the first network leaf switch in the first site may utilize the route path, including the secure connection tunnel utilizing the physical link between the first border gateway switch and the second border gateway switch, to transmit the data to the second border leaf gateway switch in the second site.

As described herein, a computing resource can generally include any type of computing resources, such as, for example, physical resource(s) associated with physical servers and/or physical links in a network. Additionally, or alternatively, the physical resource(s) may be apportioned or allocated to a virtual resource implemented by virtualization techniques, such as containers, virtual machines, virtual storage, and so forth, where the virtual resource(s) may utilize the allocated portions of the physical resources of the physical servers in the network. Further, although the techniques described as being implemented in data centers and/or a multi-site cloud computing network, the techniques are generally applicable for any network of devices managed by any entity where computing resource(s) are provisioned. In some instances, the techniques may be performed by a scheduler or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to collecting reachability data indicating physical links between border gateway switches in separate sites of a multi-site network, or physical links between border gateway switches and core routers, to generate a physical underlay model and a logical overlay model of the multi-site network. For instance, the techniques described herein may allow for generation of the logical overlay model of a multi-site network indicating reachability between devices in separate sites of the multi-site network. Additionally, the border gateway switches may utilize pair-wise encryption keys and/or cryptographic algorithms provided by the network controller to establish secure connection tunnels between separate sites of the multi-site network. By utilizing the logical links between border gateway switches to establish the secure connection tunnels, the network controller may configure a path for an encrypted transmission or flow of data between computing resources in separate sites of the multi-site network at line rate, which was not previously possible. Additionally, the techniques described herein allow for automated scalability of the multi-site network, such as, for example, adding new sites, new border gateway switches, and/or new core switches to the multi-site network in an automated manner, which was not previously possible.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram 100 of an example flow for collecting reachability data to generate a logical overlay model and establish secure connection tunnels across a multi-site cloud computing network 102. The cloud computing network may comprise one or more data centers across one or more network site(s) 104(*a*), 104(*b*) that include various networking components, such as, a network controller 106, spine network switch(es) 108(*a*), 108(*b*), leaf network switch(es) 110(*a*), 110(*b*), network border gateway switch(es) 112(*a*), 112(*b*), and/or physical servers 114. In some examples, the network site(s) 104 may be located across geographic areas, and the cloud computing network 102 may be a distributed network through which users (often customers) may interact via user devices to manage or otherwise interact with service provided by the cloud computing network 102.

The cloud computing network 102 may provide on-demand availability of computing system resources of physical server(s) 114, such as data storage, computing power (e.g., CPU, GPU, etc.), networking, databases, etc., without direct active management by users. In some examples, the cloud computing network 102 may be managed and maintained by a service provider such that users do not have to invest in and maintain the computing infrastructure for their computing resource needs. Generally, a user may be provided access to, or allocated use of, a portion of the computing resources of physical server(s) 114 in the cloud computing network 102. The cloud computing network 102 may scale, such as by spinning up resources or spinning down resources, based on demand for the individual users. The portions of the cloud computing network 102 may be allocated using hardware virtualization such that portions of the cloud computing network 102 can be configured and managed by the user (e.g., security configuration, load balancing configuration, etc.). However, the cloud computing network 102 need not be managed by a service provider, and can be managed by any entity, including the user themselves that run the applications or services. In some examples, physical server(s) 114 may host one or more virtual machines. Each virtual machine may be configured to execute one of various operations and act as one or more virtual components for the cloud computing network 102, such as, for example, resources 116.

In some examples, a virtual machine may be configured to execute one of various operations and act as a network border gateway 112. In some examples, a network border gateway switch 112(*a*) disposed in a first network site 104(*a*) of a multi-site cloud computing network 102 may be physically connected to a network border gateway switch 112(*b*) disposed in a second network site 104(*b*) of the multi-site cloud computing network. In some examples, the network border gateway switch(es) 112 may generate reachability data indicating such a physical link using various network protocols, such as, for example, a Link Layer Discovery Protocol (LLDP), a Control Point Discovery (CPD) protocol, or a Cisco Discovery Protocol (CDP). Additionally, or alternatively, a network border gateway switch 112 may generate metadata indicating an internet protocol (IP) address and/or a networking protocol associated with the network border gateway switch.

In some examples, the network controller 106 associated with the multi-site cloud computing network 102 may be configured to collect the reachability data and/or the metadata from network border gateway switch(es) 112 of the multi-site network. In some examples, the network controller may be configured to utilize the reachability data indicating the physical link 124 between the network border gateway switch(es) 112(*a*), 112(*b*) of the individual sites 104(*a*), 104(*b*) of the multi-site cloud computing network 102 to generate a physical underlay model 118 representing a physical underlay, or network transport capabilities, of the multi-site cloud computing network 102. Additionally, or alternatively, the network controller 106 may be configured to utilize the physical underlay model 118 of the multi-site network and/or the metadata indicating the IP addresses and network protocols of the network border gateway switch(es) 112(*a*), 112(*b*) of the individual sites 104(*a*), 104(*b*) of the multi-site cloud computing network 102 to generate a logical overlay model 120 representing a logical overlay, or overlay control-plane, of the multi-site cloud computing network 102.

Additionally, or alternatively, the network controller 106 may be configured to generate encryption key to establish a secure connection tunnel 122 between the network border gateway switch 112(a) of the network site 104(a) and the network border gateway switch 112(b) of the network site 104(b) of the multi-site cloud computing network 102. In some examples, the network controller 106 may be configured to generate universal encryption keys configured to establish all of the secure encryption tunnels 122 between the border gateway switch(es) 112 of the individual sites 104 of a multi-site cloud computing network 102. Additionally, or alternatively, the network controller 106 may be configured to utilize the metadata indicating the IP addresses and network protocols of the network border gateway switch(es) 112 to generate pair-wise encryption keys. In some examples, the pair-wise encryption keys may be configured to be unique from one another and to establish a secure encryption tunnel 122 between a pair of network border gateway switch(es) 112(a), 112(b) that are associated with the input metadata. In some examples, the network controller 106 may be configured to generate an encryption key model 124 including the pair-wise encryption keys. For example, the network controller 106 may be configured to store a mapping, or an association between an encryption key and the physical link between the associated network border gateway switch(es) 112(a), 122(b) in an encryption key data store associated with the network controller 106. In some examples, the network controller 106 may be configured to utilize the encryption key data store to generate the encryption key model 124. Additionally, or alternatively, the network controller 106 may be configured to generate and/or provide a cryptographic algorithm associated with the encryption key to the associated network border gateway switch(es) 112.

Generally, the number of network sites 104, network border gateway switch(es) 112, and/or resources 116 may scale based on a number of users 126 interacting with the cloud computing network 102. The users 126 may comprise one or more of individual users, groups of users, organizations, businesses, or other entities that interact with the cloud computing network 102 via respective user devices. The user devices may be any type of computing device capable of connecting to the cloud computing network 102 via a suitable data communications network 128 such as, but not limited to, a laptop or desktop computer, a tablet computing device, a server computer, a television, or a mobile telephone. Administrative users employed by the operator of the cloud computing network 102, such as administrators managing the operation of the cloud computing network 102, might also connect with, manage, and utilize resources provided by the service provider network 102 in a similar fashion.

The users 126 may provide input data 130 via the network(s) 128 to interact with the service that is supported by the resources 116 running on the servers 114. For example, the users 126 may submit requests to process data, retrieve data, store data, and so forth such that virtual machines hosting the resources 116 are spun up or spun down to process the requests based on demand. Additionally, or alternatively, the users 126 may be an administrative user 126 that may provide input data 130 via the network(s) 128 to interact with the multi-site cloud computing network 102 and add and/or remove networking device. For example, the administrative users 126 may submit requests to add a site 104 and/or a network switch, such as, for example, a network border gateway switch 112.

A network controller 106 may communicate with respective network switches, such as, for example, spine network switch(es) 108, leaf network switch(es) 110, and/or network border gateway switch(es) 112 to receive requests from a leaf network switch 110 associated with a physical server 114 hosting a computing resource 116 in the multi-site cloud computing network 102 to transmit data to a leaf network switch 110 associated with another physical server 114 hosting a computing resource 116 in a separate site 104 of the multi-site cloud computing network 102. In some examples, the network controller 106 may be configured to determine a route path to transmit the data between leaf network switches 110 in the separate sites 104 of the multi-site cloud computing network 102. For example, the network controller 106 may be configured to utilize the physical underlay model 118 and/or the logical overlay model 120 to determine a route path utilizing the secure connection tunnel 122 to transmit the data between the leaf network switches 110 in the separate sites 104 of the multi-site cloud computing network 102.

At "1," a network controller 106 associated with a multi-site cloud computing network 102 may collect reachability data from a first network border gateway switch 112(a) disposed in a first site 104(a) and a second network border gateway switch 112(b) disposed in a second site 104(b). In some examples, the reachability data may indicate a physical link, that may be utilized to establish a secure connection tunnel 122, between the first network border gateway switch 112(a) and the second network border gateway switch 112(b).

At "2," the network controller 106 may then generate a physical underlay model 118 of the multi-site cloud computing network 102. In some examples, the physical underlay model 118 may represent a physical underlay, or network transport capabilities, of the multi-site cloud computing network 102. Additionally, or alternatively, the network controller 106 may generate the physical underlay model 118 using the reachability data.

At "3," the network controller 106 may receive metadata from one or more network border gateway switch(es) 112(a) of the first site 104(a) and one or more network border gateway switch(es) 112(b) of the second site 104(b). In some examples, the metadata may indicate internet protocol (IP) addresses and/or network protocol(s) associated with the respective network border gateway switches 112(a), 112(b).

At "4," the network controller 106 may then generate a logical overlay model 120 of the multi-site cloud computing network 102. In some examples, the logical overlay model 120 may represent a logical overlay, or overlay control-plane, of the multi-site cloud computing network 102. Additionally, or alternatively, the network controller 106 may generate the logical overlay model 120 based at least in part on the physical overlay model 118. Additionally, or alternatively, the network controller 106 may generate the logical overlay model 120 based at least in part on the metadata received from the one or more network border switches 112.

At "5," the network controller 106 may receive a request to transmit data from a computing resource 116 executing on a physical server 114 associated with a leaf network switch 110(a)(n) in the first network site 104(a) to a computing resource 116 executing on a physical server 114 associated with at least one leaf network switch 110(b) in the second network site 104(b). Additionally, or alternatively, the network controller 106 may receive the request to transmit the data from a spine network switch 108(a)(1)-(n) associated with the leaf network switch 110(a)(n).

At "6," the network controller 106 may determine a route path to transmit the data from the computing resource 116 in the first network site 104(a) to the computing resource 116 in the second network site 104(b). In some examples, the network controller 106 may determine the route path including the secure encryption tunnel 122 utilizing the physical link between the first network border gateway switch 112(a) and the second network border gateway switch 112(b). In some examples, the network controller 106 may determine the route path based at least in part on the logical overlay model 120.

At "7," the network controller may provide the route path to the leaf network switch 110(a)(n) associated with the computing resource 116.

Figure 1B:
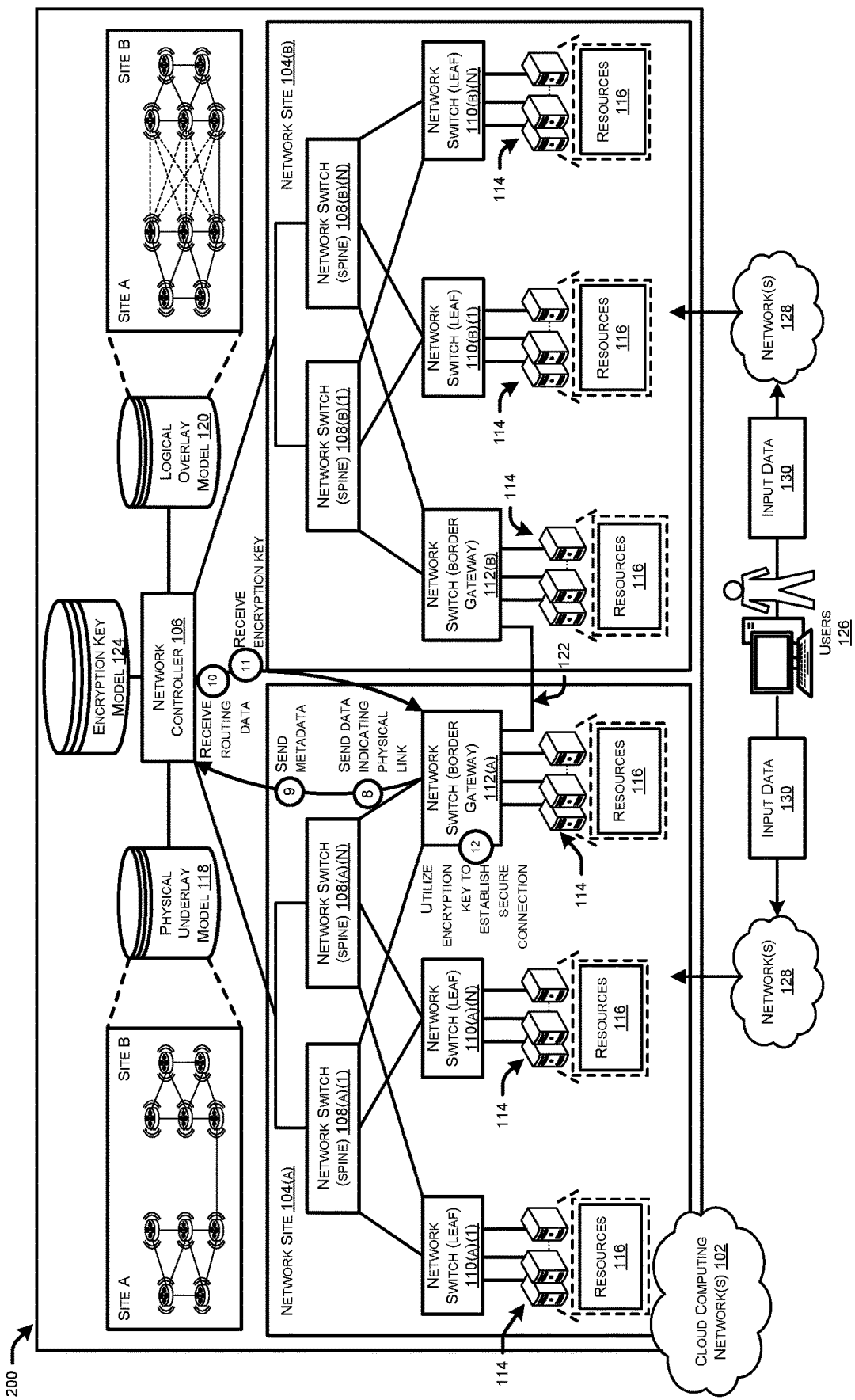
FIG. 1B illustrates a system-architecture diagram of an example flow for network border gateways that are physically linked and disposed in different sites of a multi-site cloud computing network to send indications of the physical link to a network controller of the multi-site network and utilize the physical link to establish a secure connection tunnel with a unique encryption key.

In some examples, the example flow may continue from step "7" of FIG. 1A to step "8" of FIG. 1B. Additionally, or alternatively, the example flow may begin from step "8" of FIG. 1B and continue from step "12" of FIG. 1B to step "1" of FIG. 1A. Additionally, or alternatively, the example flow from FIG. 1A may be executed simultaneously with the example flow of FIG. 1B.

FIG. 1B illustrates a system-architecture diagram 200 of an example flow for network border gateway switches 112(a), 112(b) that are physically linked and disposed in different sites 104(a), 104(b) of a multi-site cloud computing network 102 to send indications of the physical link to a network controller 106 of the multi-site network 102 and utilize the physical link to establish a secure connection tunnel 122 with a unique encryption key.

A network controller 106 may be configured to an generate encryption key configured to establish a secure connection tunnel 122 between the network border gateway switch 112(a) the network site 104(a) and the network border gateway switch 112(b) of the network site 104(b) of the multi-site cloud computing network 102. In some examples, the network controller 106 may be configured to generate universal encryption keys configured to establish all of the secure encryption tunnels 122 between the border gateway switch(es) 112 of the individual sites 104 of a multi-site cloud computing network 102. Additionally, or alternatively, the network controller 106 may be configured to utilize the metadata indicating the IP addresses and network protocols of the network border gateway switch(es) 112 to generate pair-wise encryption keys. In some examples, the pair-wise encryption keys may be configured to be unique from one another and to establish a secure encryption tunnel 122 between a pair of network border gateway switch(es) 112(a), 112(b) that are associated with the input metadata. In some examples, the network controller 106 may be configured to generate an encryption key model 124 including the pair-wise encryption keys. For example, the network controller 106 may be configured to store a mapping, or an association between an encryption key and the physical link between the associated network border gateway switch(es) 112(a), 122(b) in an encryption key data store associated with the network controller 106. In some examples, the network controller 106 may be configured to utilize the encryption key data store to generate the encryption key model 124. Additionally, or alternatively, the network controller 106 may be configured to generate and/or provide a cryptographic algorithm associated with the encryption key to the associated network border gateway switch(es) 112.

The network controller 106 may communicate with respective network switches, such as, for example, spine network switch(es) 108, leaf network switch(es) 110, and/or network border gateway switch(es) 112 to receive requests from a leaf network switch 110 associated with a physical server 114 hosting a computing resource 116 in the multi-site cloud computing network 102 to transmit data to a leaf network switch 110 associated with another physical server 114 hosting a computing resource 116 in a separate site 104 of the multi-site cloud computing network 102. In some examples, the network controller 106 may be configured to determine a route path to transmit the data between leaf network switches 110 in the separate sites 104 of the multi-site cloud computing network 102. For example, the network controller 106 may be configured to utilize the physical underlay model 118 and/or the logical overlay model 120 to determine a route path utilizing the secure connection tunnel 122 to transmit the data between the leaf network switches 110 in the separate sites 104 of the multi-site cloud computing network 102.

At "8," a first network border gateway switch 112(a) disposed in a first site 104(a) of the multi-site cloud computing network 102 may send reachability data indicating a physical link to a second network border gateway switch 112(b) disposed in a second site 104(b) of a multi-site cloud computing network 102. Additionally, or alternatively, the second network border gateway switch 112(b) may send reachability data indicating the physical link to the first network border switch 112(a). In some examples, the first network border gateway switch 112(a) and/or the second network border gateway switch 112(b) may discover the physical link and/or generate the reachability data indicating such a physical link using various network protocols, such as, for example, a Link Layer Discovery Protocol (LLDP), a Control Point Discovery (CPD) protocol, or a Cisco Discovery Protocol (CDP).

At "9," the first network border gateway switch 112(a) may send metadata to the network controller 106. Additionally, or alternatively, the second network border gateway switch 112(b) may send metadata to the network controller 106. In some examples, the metadata may indicate an internet protocol (IP) address and/or a networking protocol associated with the respective network border gateway switch 112.

At "10," the first network border gateway switch 112(a) may receive routing data from the network controller 106. Additionally, or alternatively, the second network border gateway switch 112(b) may receive routing data from the network controller 106. Additionally, or alternatively, one or more spine network switch(es) 108 and/or one or more leaf network switches 110 disposed in the first network site 104(a) and/or the second network site 104(b) may receive the routing data. In some examples, the routing data may indicate a data transmission route from a computing resource 116 in the first network site 104(a) to a computing resource 116 in the second network site 104(b).

At "11," the first network border gateway switch 112(a) may receive an encryption key from the network controller 106. Additionally, or alternatively, the second network border gateway switch 112(b) may receive the encryption key from the network controller 106. In some examples, the encryption key may be configured as a pair-wise encryption key configured such that only the first network border gateway switch 112(a) and/or the second network border gateway switch 112(b) may utilize the encryption key. Additionally, or alternatively, the first network border gateway switch 112(a) and/or the second network border gateway switch 112(b) may receive a cryptographic algorithm associated with the encryption key, such that the cryptographic algorithm may be utilized in association with the encryption key to encrypt and decrypt network traffic.

At "12," the first border gateway switch 112(a) may utilize the encryption key to establish a secure connection tunnel 122 from the first network site 104(a) to the second network border gateway switch 112(b) in the second network site 104(b). Additionally, or alternatively, the second border gateway switch 112(b) may utilize the encryption key to establish a secure connection tunnel 122 from the second network site 104(b) to the first network border gateway switch 112(a) in the first network site 104(a).

Figure 2A:
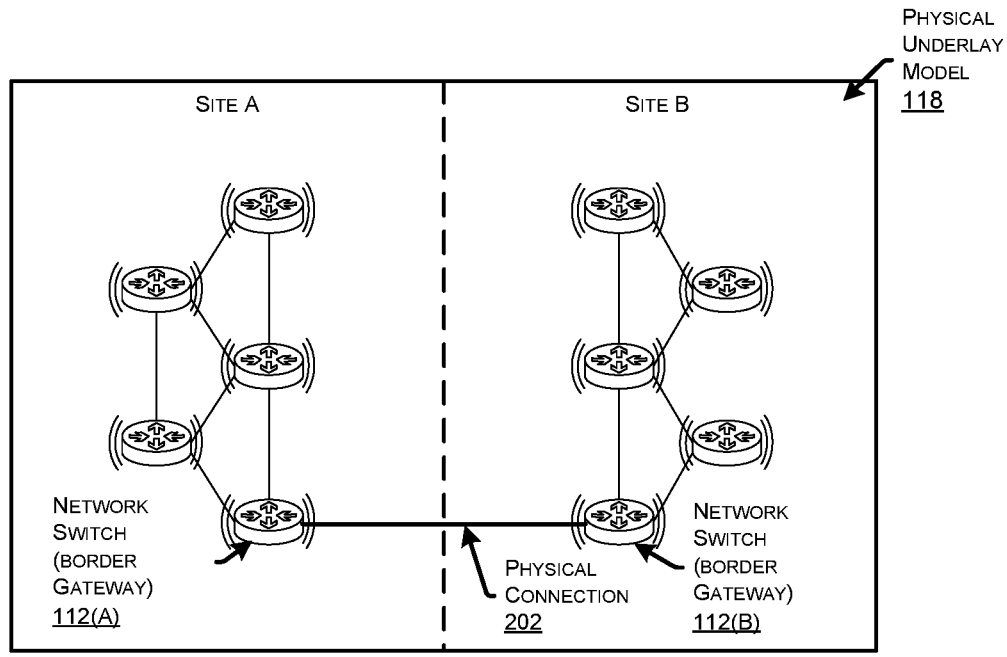
FIG. 2A illustrates a diagram of a physical underlay model of an example multi-site network including a physical connection between respective border gateways.

FIG. 2A illustrates a diagram of a physical underlay model 118 of an example multi-site cloud computing network 102 including a physical connection 202 between respective border gateway switches 112(a), 112(b).

In some examples, the physical underlay model 118 may include one or more network sites of a cloud computing network 102, such as, for example, site A and site B. In some examples, the physical underlay model 118 may include one or more network switches associated with the one or more sites. For example, the physical underlay model 118 may include one or more spine network switch(es) 108, one or more leaf network switch(es) 110, and/or one or more border gateway switch(es) 112. In some examples, the physical underlay model 118 may include a physical connection 202 connecting a first network border gateway switch 112(a) in site A to a second border gateway switch 112(b) in site B.

In some examples, the physical underlay model 118 may be generated based on reachability data received from the first network border gateway switch 112(a) and/or the second network border gateway switch 112(b) and/or collected by the network controller 106. In some examples, the reachability data may indicate a physical link between network border gateway switch(es) in separate sites of the multi-site cloud computing network 102. In some examples, a network border gateway switch 112 may generate the reachability data indicating such a physical link using various network protocols, such as, for example, a Link Layer Discovery Protocol (LLDP), a Control Point Discovery (CPD) protocol, or a Cisco Discovery Protocol (CDP).

Figure 2B:
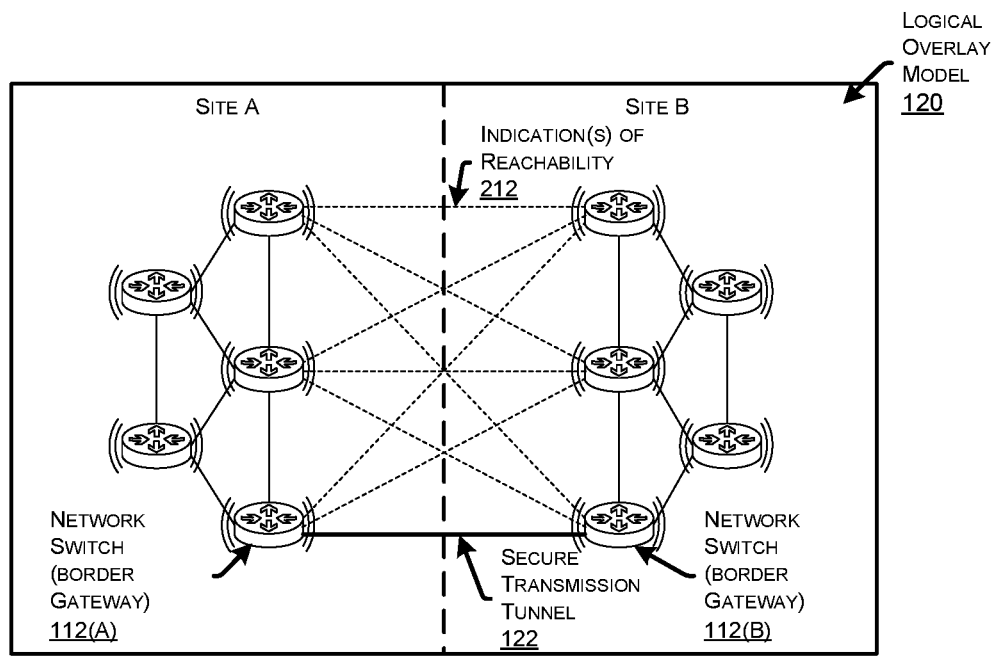
FIG. 2B illustrates a diagram of a logical overlay model of an example multi-site network including a physical connection between respective border gateways.

FIG. 2B illustrates a diagram of example logical overlay model 120 of an example multi-site cloud computing network 102 including a secure connection tunnel 122 between respective border gateway switches 112(a), 112(b), and one or more indication(s) of reachability 212 indicating reachability between one or more network devices in a first site and one or more network devices in a second site.

In some examples, the logical overlay model 120 may include one or more network sites of a cloud computing network 102, such as, for example, site A and site B. In some examples, the logical overlay model 120 may include one or more network switches associated with the one or more sites. For example, the logical overlay model 120 may include one or more spine network switch(es) 108, one or more leaf network switch(es) 110, and/or one or more border gateway switch(es) 112. In some examples, the logical overlay model 120 may include a secure transmission tunnel 122 utilizing a physical connection 202 connecting a first network border gateway switch 112(a) in site A to a second border gateway switch 112(b) in site B. In some examples, the logical overlay model 120 may include one or more indication(s) of reachability 212. In some examples, the indication(s) of reachability 212 may indicate the network switch(es) disposed in site A that may utilize the secure transmission tunnel 122 to communicate with network switch(es) disposed in site B.

In some examples, the logical overlay model 120 may be generated based on the physical underlay model 118. Additionally, or alternatively, the logical overlay model 120 may be generated based at least in part on the reachability data received from the first network border gateway switch 112(a) and/or the second network border gateway switch 112(b) and/or collected by the network controller 106.

Figure 3:
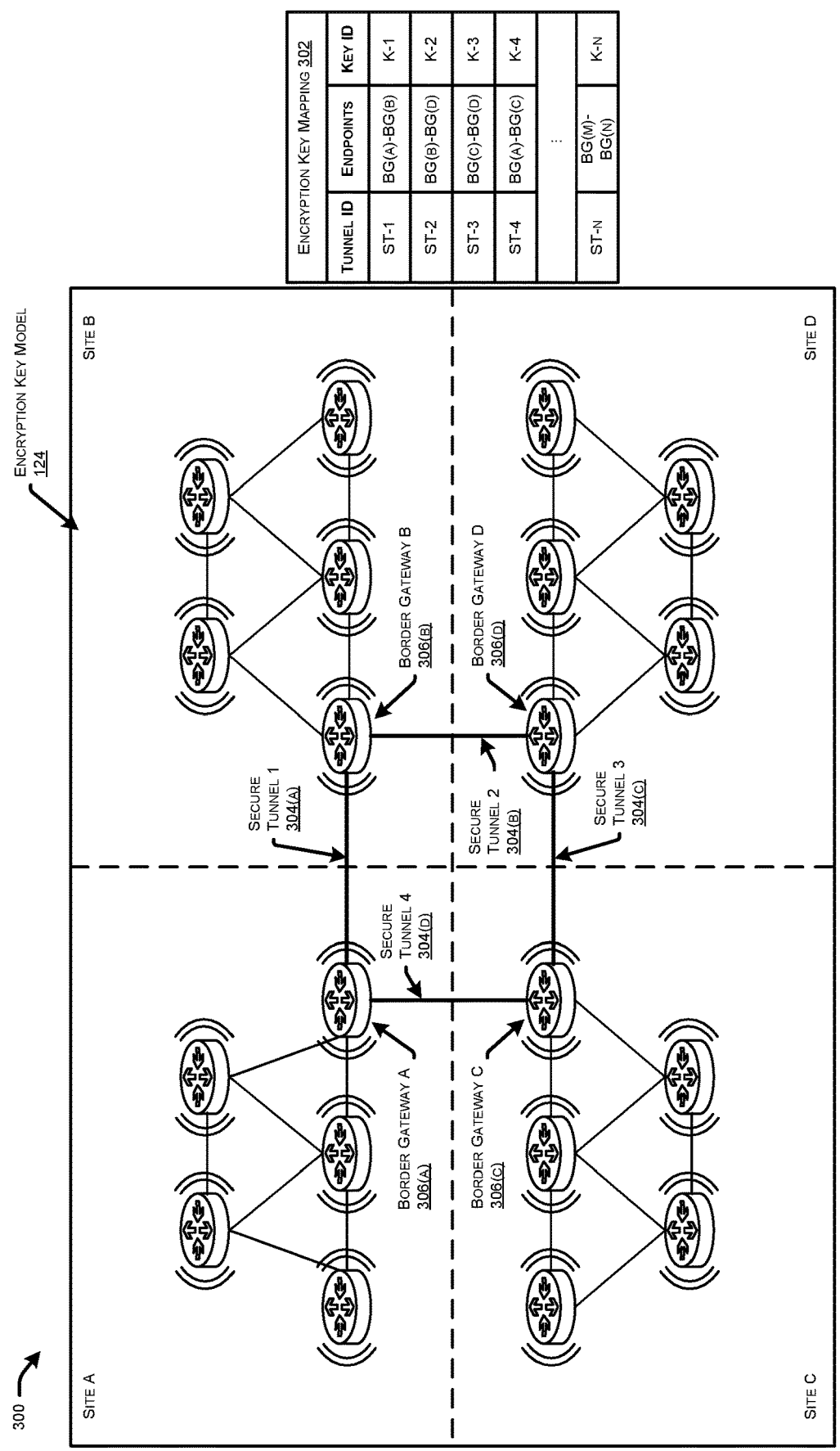
FIG. 3 illustrates a diagram of an encryption key model including an encryption key mapping for establishing secure connection tunnels utilizing a physical connection between border gateways disposed in respective sites of a multi-site network.

FIG. 3 illustrates a diagram of an encryption key model 124 including an encryption key mapping 302 for establishing one or more secure connection tunnel(s) 304(a)-(b) utilizing a physical connection between respective border gateway switch(es) 306(a)-(b) disposed in respective sites of a multi-site cloud computing network 102.

In some examples, the encryption key model 124 may include one or more sites of the multi-site cloud computing network 102, such as, for example, Site A, Site B, Site C, and/or Site D. Additionally, or alternatively, the multi-site cloud computing network 102 may include any number of sites. In some examples, the one or more sites may include one or more network switch(es) associated with the one or more sites. For example, the encryption key model 124 may include one or more spine network switch(es) 108, one or more leaf network switch(es) 110, and/or one or more border gateway switch(es) 306 (or 112). In some examples, the encryption key model 124 may include one or more secure tunnel(s) 304(a)-(d), such as, for example, tunnel 1 304(a), tunnel 2 304(b), tunnel 3 304(c), and/or tunnel 4 304(d). In some examples, the encryption key model 124 may include an encryption key mapping 302 including one or more records representing the associations between the encryption keys and the secure tunnels 304 between associated border gateway switch(es) 306.

For example, Site A includes border gateway A 306(a) that may be configured to utilize secure tunnel 1 304(a) to transmit data to border gateway B 306(b) disposed in Site B. The encryption key mapping 302 includes a first record representing the association between secure tunnel 1 304(a), border gateway A 306(a) and border gateway B 306(b), and key ID K-1, indicating that border gateway A 306(a) and/or border gateway B 306(b) must utilize the Encryption key having key ID K-1 to utilize secure tunnel 1 304(a). Additionally, or alternatively, border gateway switch(es) 306 may utilize one or more secure tunnels 304 by utilizing a respective encryption key. Additionally, or alternatively, the network controller 106 may be configured to generate and/or provide a cryptographic algorithm associated with the encryption key to the associated network border gateway switches 306.

In some examples, the encryption key mapping 302 may be generated by the network controller 106 based on the physical underlay model 118, the logical overlay model 120, and/or metadata received from the one or more border gateway switch(es) 306. In some examples, the metadata may indicate an internet protocol (IP) address and/or networking protocols associated with a network border gateway switch 306.

Additionally, or alternatively, the encryption key model 124 may be generated by the network controller 106 based on the encryption key mapping 302, the physical underlay model 118, the logical overlay model 120, and/or the metadata received from the one or more border gateway switch(es) 306.

Figure 4:
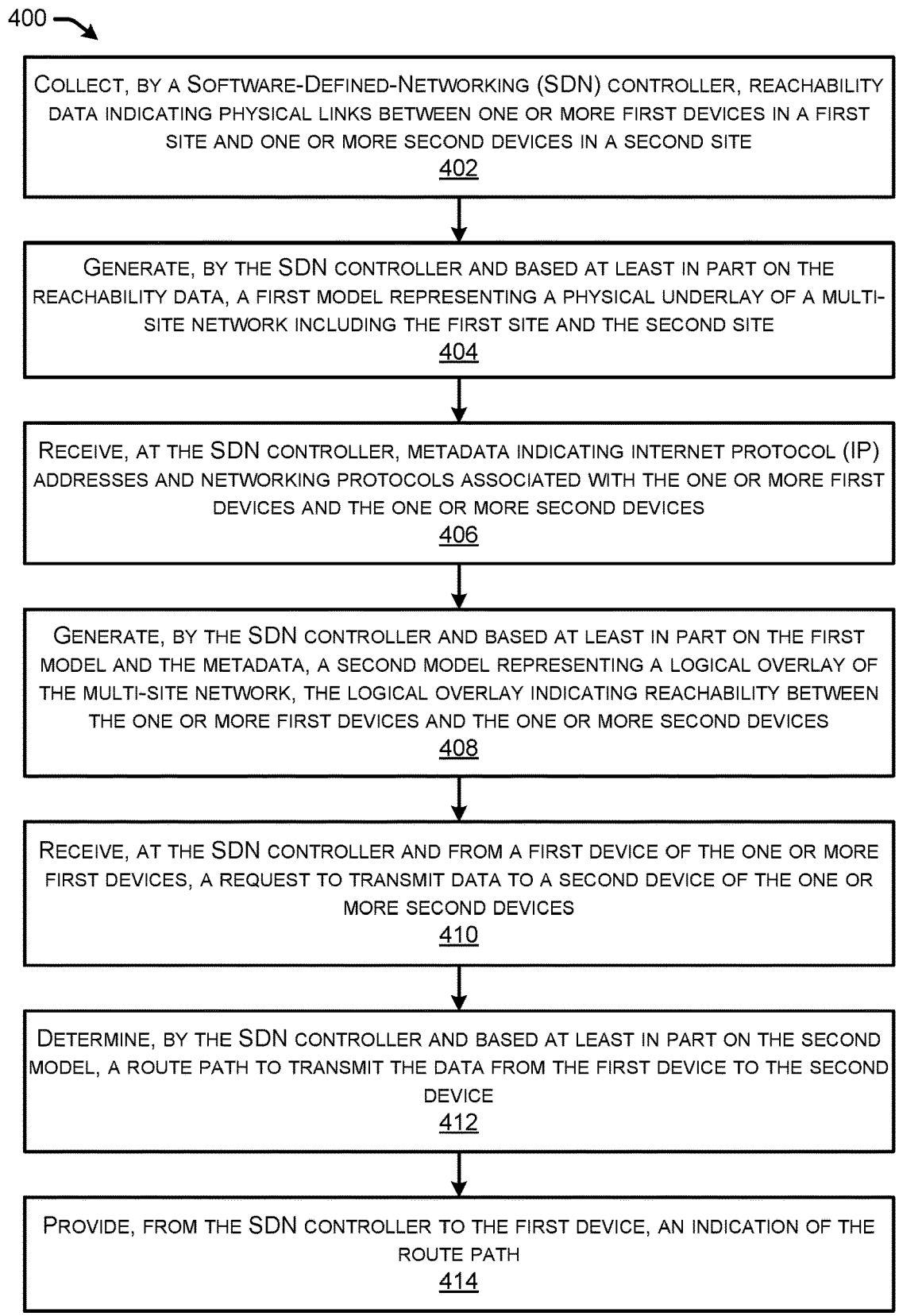
FIG. 4 illustrates a flow diagram of an example method for a Software-Defined Networking (SDN) controller of a multi-site cloud computing network to collect reachability data and generate physical underlay and logical overlay models of the multi-site network to determine route paths across different sites of the multi-site network.

FIGS. 4 and 5 illustrate flow diagrams of example methods 400 and 500 and that illustrate aspects of the functions performed at least partly by the multi-site cloud computing network 102 as described in FIGS. 1A-2B. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4 and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for a In some examples, the method 400 may be performed by a system comprising one or more processors and one or more non-transitory computer-readable media storing computer-executable instructions that, when executed by the one or more processors, cause the one or more processors to perform the method 400.

At 402, a Software-Defined-Networking (SDN) controller 106 associated with a multi-site cloud computing network 102 may collect reachability data. In some examples, the reachability data may indicate physical links between one or more first devices in a first site and one or more second devices in a second site of the multi-site cloud computing network 102. In some examples, the one or more first devices and/or one or more second devices may be configured as a spine network switch 108, a leaf network switch 110, and/or a border gateway switch 112.

At 404, the SDN controller 106 may generate a first model representing a physical underlay of the multi-site cloud computing network 102 including the first site and the second site. In some examples, the SDN controller 106 may generate the first model based at least in part on the reachability data. In some examples, the first model may be configured as the physical underlay model 118 from any one of FIGS. 1A-2B.

At 406, The SDN controller 106 may receive metadata indicating internet protocol (IP) addresses and networking protocols associated with the one or more first devices and the one or more second devices.

At 408, the SDN controller 106 may generate a second model representing a logical overlay of the multi-site cloud computing network 102. In some examples, the SDN controller 106 may generate the second model based at least in part on the first model and/or the metadata. Additionally, or alternatively, the second model representing the logical overlay may indicate reachability between the one or more first devices and the one or more second devices. In some examples, the second model may be configured as the logical overlay model 120 from any one or FIGS. 1A-2B.

At 410, the SDN controller 106 may receive a request from a first device of the one or more first devices to transmit data to a second device of the one or more second devices. In some examples, the first device and/or the second device may be configured as a leaf network switch 110. Additionally, or alternatively, the first device and/or the second device may be configured as a computing resource receiving input from one or more user(s) 126.

At 412, the SDN controller 106 may determine a route path to transmit the data from the first device to the second device. In some examples, the SDN controller 106 may determine the route path based at least in part on the second model. Additionally, or alternatively, the SDN controller 106 may determine the route path based at least in part on the first model and/or the metadata. In some examples, the route path may include a third device in the second site and/or a physical link between the first device and the third device.

At 414, the SDN controller 106 may provide an indication of the route path to the first device. Additionally, or alternatively, the SDN controller 106 may provide the indication of the route path to the one or more first devices, the one or more second devices, and/or the second device.

Additionally, or alternatively, the method 400 may include storing an association between the encryption key and the physical link between the first device and the third device in an encryption key data store associated with the SDN controller 106. The method 400 may further include generating, by the SDN controller 106 and based at least in part on the encryption key data store, a third model representing the associations between the encryption keys and the physical links of the multi-site network 102. Additionally, or alternatively, the third model may be configured as the encryption key model 124 from any one of FIGS. 1A, 1B, and/or 3.

FIG. 5 illustrates a flow diagram of an example method 500 for In some examples, the method 500 may be performed by a system comprising one or more processors and one or more non-transitory computer-readable media storing computer-executable instructions that, when executed by the one or more processors, cause the one or more processors to perform the method 500.

At 502, a first device 112(*a*) in a first site 104(*a*) of a multi-site cloud computing network 102 may send, to a Software-Defined-Networking (SDN) controller 106 associated with the multi-site cloud computing network 102, reachability data indicating a physical link to a second network border gateway switch 112(*b*) disposed in a second site 104(*b*) of a multi-site cloud computing network 102. Additionally, or alternatively, the second device 112(*b*) may send reachability data indicating the physical link to the first device 112(*a*). In some examples, the first device 112(*a*) and/or the second device 112(*b*) may discover the physical link and/or generate the reachability data indicating such a physical link using various network protocols, such as, for example, a Link Layer Discovery Protocol (LLDP), a Control Point Discovery (CPD) protocol, or a Cisco Discovery Protocol (CDP).

At 504, the first device 112(*a*) may send metadata to the SDN controller 106. Additionally, or alternatively, the second device 112(*b*) may send metadata to the SDN controller 106. In some examples, the metadata may indicate an internet protocol (IP) address and/or a networking protocol associated with the first device 112(*b*) and/or the second device 112(*b*).

At 506, the first device 112(*a*) may receive routing data from the SDN controller 106. Additionally, or alternatively, the second device 112(*b*) may receive the routing data from the SDN controller 106. In some examples, the routing data may indicate a data transmission route between the first device 112(*a*) and the second device 112(*b*). I At 508, the first device 112(*a*) may receive an encryption key from the SDN controller 106. Additionally, or alternatively, the second device 112(*b*) may receive the encryption key from the SDN controller 106. In some examples, the encryption key may be configured to establish a secure connection tunnel 122 between the first device 112(a) and the second device 112(b).

At 510, the first device 112(a) may utilize the encryption key to establish the secure connection tunnel 122 between the first device 112(a) in the first site 104(a) and the second device 112(b) in the second site 104(b). Additionally, or alternatively, the second device 112(b) may utilize the encryption key to establish the secure connection tunnel 122 between the second device 112(b) in the second site 104(b) and the first device 112(a) in the first site 104(a).

Figure 6:
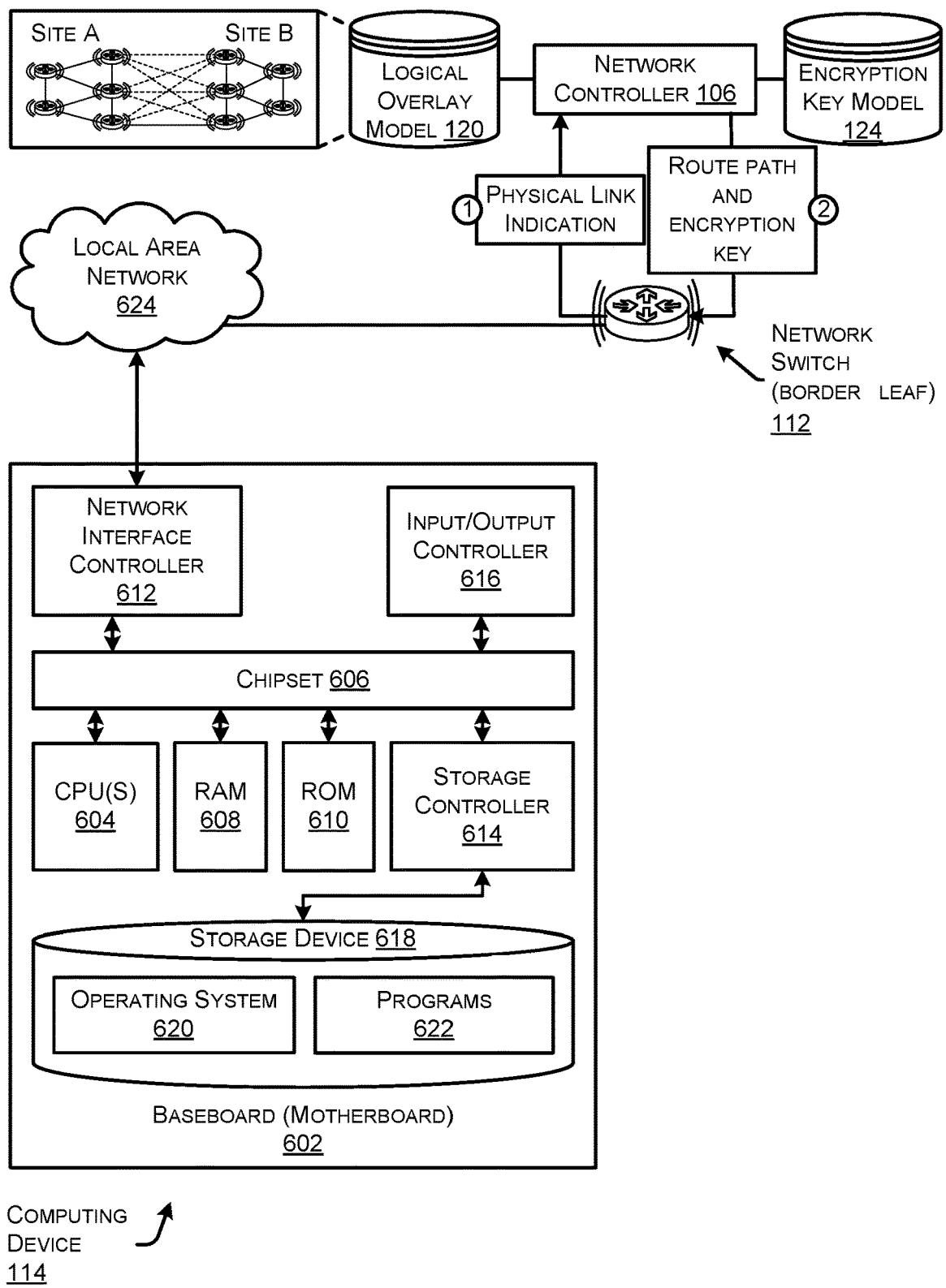
FIG. 6 is a computer architecture diagram showing an illustrative computer hardware architecture for implementing a server device that can be utilized to implement aspects of the various technologies presented herein.

FIG. 6 is a computing system diagram illustrating a configuration for a data center 600 that can be utilized to implement aspects of the technologies disclosed herein. The example data center 600 shown in FIG. 6 includes several server computers 602A-602E (which might be referred to herein singularly as "a server computer 602" or in the plural as "the server computers 602") for providing computing resources. In some examples, the server computers 602 may include, or correspond to, the servers 114 described herein.

The server computers 602 can be standard tower, rack-mount, or blade server computers configured appropriately for providing the computing resources described herein. As mentioned above, the computing resources provided by the cloud computing network 102 can be data processing resources such as VM instances or hardware computing systems, database clusters, computing clusters, storage clusters, data storage resources, database resources, networking resources, and others. Some of the servers 502 can also be configured to execute a resource manager capable of instantiating and/or managing the computing resources. In the case of VM instances, for example, the resource manager can be a hypervisor or another type of program configured to enable the execution of multiple VM instances on a single server computer 602. Server computers 602 in the data center 600 can also be configured to provide network services and other types of services.

In the example data center 600 shown in FIG. 6, an appropriate LAN 608 is also utilized to interconnect the server computers 602A-602E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 600, between each of the server computers 602A-602E in each data center 600, and, potentially, between computing resources in each of the server computers 602. It should be appreciated that the configuration of the data center 600 described with reference to FIG. 6 is merely illustrative and that other implementations can be utilized.

In some examples, the server computers 602 may each execute one or more resources 116 that support a service or application, such as, for example, a multicast data source 118, and/or multicast data destination 120, provisioned across a set or cluster of servers 602. The resources 116 on each server computer 602 may support a single application or service, or multiple applications or services (for one or more users).

In some instances, the cloud computing network 102 may provide computing resources, like application containers, VM instances, and storage, on a permanent or an as-needed basis. Among other types of functionality, the computing resources provided by the cloud computing network 102 may be utilized to implement the various services described above. The computing resources provided by the cloud computing network 102 can include various types of computing resources, such as data processing resources like application containers and VM instances, data storage resources, networking resources, data communication resources, network services, and the like.

Each type of computing resource provided by the cloud computing network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network 102 can also be configured to provide other types of computing resources not mentioned specifically herein.

The computing resources provided by the cloud computing network 102 may be enabled in one embodiment by one or more data centers 600 (which might be referred to herein singularly as "a data center 600" or in the plural as "the data centers 600"). The data centers 600 are facilities utilized to house and operate computer systems and associated components. The data centers 600 typically include redundant and backup power, communications, cooling, and security systems. The data centers 600 can also be located in geographically disparate locations. One illustrative embodiment for a data center 600 that can be utilized to implement the technologies disclosed herein will be described below with regard to FIG. 6.

FIG. 6 shows an example computer architecture for a computing device (or network switch) 114 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The computing device 114 may, in some examples, correspond to a physical server 114 described herein.

The computing device 114 includes a baseboard 114, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 114.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 114. The chipset 606 can provide an interface to a RAM 608, used as the main memory in the computing device 114. The chipset 606 can further provide an interface to a computer-readable storage medium such as a read-only memory ("ROM") 610 or non-volatile RAM ("NVRAM") for storing basic routines that help to startup the computing device 114 and to transfer information between the various components and devices. The ROM 610 or NVRAM can also store other software components necessary for the operation of the computing device 114 in accordance with the configurations described herein.

The computer 114 can operate in a networked environment using logical connections to remote computing devices and computer systems through a network, such as the network 624. The chipset 606 can include functionality for providing network connectivity through a NIC 612, such as a gigabit Ethernet adapter. The NIC 612 is capable of connecting the computing device 114 to other computing devices over the network 624 (or 128). It should be appreciated that multiple NICs 612 can be present in the computing device 114, connecting the computer to other types of networks and remote computer systems.

The computing device 114 can be connected to a storage device 618 that provides non-volatile storage for the computer. The storage device 618 can store an operating system 620, programs 622, and data, which have been described in greater detail herein. The storage device 618 can be connected to the computing device 114 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 114 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 114 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 114 can further read information from the storage device 618 by detecting the physical states or characteristics of one or more particular locations within the physical storage units.

In addition to the mass storage device 618 described above, the computing device 114 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 114. In some examples, the operations performed by the cloud computing network 102, and or any components included therein, may be supported by one or more devices similar to computing device 114. Stated otherwise, some or all of the operations performed by the cloud computing network 102, and or any components included therein, may be performed by one or more computer devices 114 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 114. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 618 can store other system or application programs and data utilized by the computing device 114.

In one embodiment, the storage device 618 or other computer-readable storage media is encoded with computer-executable instructions which, when loaded into the computing device 114, transform the computer from a general-purpose computing system into a special-purpose computer capable of implementing the embodiments described herein. These computer-executable instructions transform the computing device 114 by specifying how the CPUs 604 transition between states, as described above. According to one embodiment, the computing device 114 has access to computer-readable storage media storing computer-executable instructions which, when executed by the computing device 114, perform the various processes described above with regard to FIGS. 1-5. The computing device 114 can also include computer-readable storage media having instructions stored thereupon for performing any of the other computer-implemented operations described herein.

The computing device 114 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 114 might not include all of the components shown in FIG. 6, can include other components that are not explicitly shown in FIG. 6, or might utilize an architecture completely different than that shown in FIG. 6.

The border gateway switch 112 may send and receive various data and provide it to components. For instance, the border gateway switch 112 may send an indication of a physical link to an additional border gateway switch 112 in a separate site to the network controller 106. The network border gateway switch 112 may receive a route path and/or an encryption key for establishing a secure connection tunnel with the additional border gateway switch 112 and may use the route path for routing data across separate sites of the multi-site cloud computing network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   one or more non-transitory computer-readable media comprising instructions that, when executed by the one or more processors, cause the one or more processors to perform operations comprising:
      collecting, by a Software-Defined-Networking (SDN) controller and from one or more first network devices in a first site and one or more second network devices from a second site, reachability data indicating physical links between the one or more first network devices and the one or more second network devices;
      generating, by the SDN controller and based at least in part on the reachability data, a first model representing a physical underlay of a multi-site network including the first site and the second site;
      receiving, at the SDN controller and from the one or more first network devices and the one or more second network devices, metadata indicating internet protocol (IP) addresses and networking protocols associated with the one or more first network devices and the one or more second network devices;
      generating, by the SDN controller and based at least in part on the first model and the metadata, a second model representing a logical overlay of the multi-site network, the logical overlay indicating reachability between the one or more first network devices and the one or more second network devices;
      receiving, at the SDN controller and from a first network device of the one or more first network devices, a request to transmit data to a second network device of the one or more second network devices;
      determining, by the SDN controller and based at least in part on the second model, a route path to transmit the data from the first network device to the second network device; and
      providing, from the SDN controller to the first network device, an indication of the route path.

2. The system of claim 1, wherein the physical links between the one or more first network devices in the first site and the one or more second network devices in the second site are determined using at least one of a Link Layer Discovery Protocol (LLDP), a Control Point Discovery (CPD) protocol, or a Cisco Discovery Protocol (CDP).

3. The system of claim 1, wherein the route path includes a third network device in the second site and a physical link between the first network device and the third network device, and the operations further comprising:
   generating, by the SDN controller, an encryption key configured to establish a secure connection tunnel between the first network device and the third network device;
   sending, from the SDN controller to the first network device and the third network device, the encryption key; and
   causing, by the SDN controller, the first network device and the second network device to utilize the encryption key to establish the secure connection tunnel between the first network device in the first site and the third network device in the second site.

4. The system of claim 3, the operations further comprising:
   storing an association between the encryption key and the physical link between the first network device and the third network device in an encryption key datastore associated with the SDN controller, the encryption key data store including associations between encryption keys and physical links of the multi-site network; and
   generating, by the SDN controller and based at least in part on the encryption key datastore, a third model representing the associations between the encryption keys and the physical links of the multi-site network.

5. The system of claim 3, wherein:
   the IP addresses include a first IP address associated with the first network device and a second IP address associated with the third network device; and
   the internet protocols include a first internet protocol associated with the first network device and a second internet protocol associated with the third network device; and
   the operations further comprising generating the encryption key based at least in part on the first IP address, the second IP address, the first protocol, and the second protocol.

6. The system of claim 3, wherein the encryption key is configured as at least one of:
   a universal encryption key configured to establish all secure connection tunnels in the multi-site network; or
   a unique encryption key configured to establish the secure connection tunnel between the first network device in the first site and the third network device in the second site.

7. The system of claim 1, wherein:
   the reachability data further indicates other physical links between the one or more first network devices in the first site and one or more third network devices in a third site;
   the metadata further indicates other IP addresses and other networking protocols associated with the one or more third network devices; and
   the operations further comprising:
      generating, by the SDN controller and based at least in part on the reachability data, the first model representing the physical underlay of a multi-site network including the first site, the second site, and the third site; and generating, by the SDN controller and based at least in part on the first model and the metadata, the second model representing the logical overlay of the multi-site network, the logical overlay indicating reachability between the one or more first network devices, the one or more second network devices, and the one or more third network devices.

8. The system of claim 1, the operations further comprising causing, by the SDN controller, the first network device to establish the route path to transmit the data from the first network device to the second network device.

9. A system comprising:
one or more processors; and
one or more non-transitory computer-readable media comprising instructions that, when executed by the one or more processors, cause the one or more processors to perform operations comprising:
sending, to a Software-Defined-Networking (SDN) controller and from a first network device in a first site of a multi-site network, reachability data indicating a physical link between the first network device and a second network device in a second site of the multi-site network;
sending, to the SDN controller and from the first network device, metadata indicating an internet protocol (IP) address and a networking protocol associated with the first network device;
receiving, at the first network device and from the SDN controller, routing data indicating a data transmission route between the first network device and the second network device;
receiving, at the first network device and from the SDN controller, an encryption key configured to establish a secure connection tunnel between the first network device and the second network device; and
utilizing, by the first network device, the encryption key to establish the secure connection tunnel between the first network device in the first site and the second network device in the second site.

10. The system of claim 9, the operations further comprising:
determining, by the first network device, the physical link between the first network device and the second network device using at least one of a Link Layer Discovery Protocol (LLDP), a Control Point Discovery (CPD) protocol, or a Cisco Discovery Protocol (CDP); and
generating the reachability data indicating the physical link based at least in part on the first network device determining the physical link between the first network device and the second network device.

11. The system of claim 9, wherein the encryption key is configured as at least one of:
a universal encryption key configured to establish all secure connection tunnels in the multi-site network; or
a unique encryption key configured to establish the secure connection tunnel between the first network device in the first site and a third network device in the second site.

12. The system of claim 9, wherein the first network device is a network border device type configured to establish secure connection tunnels with one or more additional network devices configured as the network border device type in additional sites of the multi-site network.

13. The system of claim 9, wherein the encryption key is based at least in part on the metadata associated with the first network device, and additional metadata associated with the second network device.

14. A computer-implemented method comprising:
collecting, by a Software-Defined-Networking (SDN) controller and from one or more first network devices in a first site and one or more second network devices from a second site, reachability data indicating physical links between the one or more first network devices and the one or more second network devices;
generating, by the SDN controller and based at least in part on the reachability data, a first model representing a physical underlay of a multi-site network including the first site and the second site;
receiving, at the SDN controller and from the one or more first network devices and the one or more second network devices, metadata indicating internet protocol (IP) addresses and networking protocols associated with the one or more first network devices and the one or more second network devices;
generating, by the SDN controller and based at least in part on the first model and the metadata, a second model representing a logical overlay of the multi-site network, the logical overlay indicating reachability between the one or more first network devices and the one or more second network devices;
receiving, at the SDN controller and from a first network device of the one or more first network devices, a request to transmit data to a second network device of the one or more second network devices;
determining, by the SDN controller and based at least in part on the second model, a route path to transmit the data from the first network device to the second network device; and
providing, from the SDN controller to the first network device, an indication of the route path.

15. The computer-implemented method of claim 14, wherein the physical links between the one or more first network devices in the first site and the one or more second network devices in the second site are determined using at least one of a Link Layer Discovery Protocol (LLDP), a Control Point Discovery (CPD) protocol, or a Cisco Discovery Protocol (CDP).

16. The computer-implemented method of claim 14, wherein the route path includes a third network device in the second site and a physical link between the first network device and the third network device, and the computer-implemented method further comprising:
generating, by the SDN controller, an encryption key configured to establish a secure connection tunnel between the first network device and the third network device;
sending, from the SDN controller to the first network device and the third network device, the encryption key; and
causing, by the SDN controller, the first network device and the second network device to utilize the encryption key to establish the secure connection tunnel between the first network device in the first site and the third network device in the second site.

17. The computer-implemented method of claim 16, further comprising:
storing an association between the encryption key and the physical link between the first network device and the third network device in an encryption key datastore associated with the SDN controller, the encryption key data store including associations between encryption keys and physical links of the multi-site network; and generating, by the SDN controller and based at least in part on the encryption key datastore, a third model representing the associations between the encryption keys and the physical links of the multi-site network.

18. The computer-implemented method of claim 16, wherein:
the IP addresses include a first IP address associated with the first network device and a second IP address associated with the third network device; and
the internet protocols include a first internet protocol associated with the first network device and a second internet protocol associated with the third network device; and
the computer-implemented method further comprising generating the encryption key based at least in part on the first IP address, the second IP address, the first protocol, and the second protocol.

19. The computer-implemented method of claim 16, wherein the encryption key is configured as at least one of:
a universal encryption key configured to establish all secure connection tunnels in the multi-site network; or
a unique encryption key configured to establish the secure connection tunnel between the first network device in the first site and the third network device in the second site.

20. The computer-implemented method of claim 14, further comprising causing, by the SDN controller, the first network device to establish the route path to transmit the data from the first network device to the second network device.

* * * * *